United States Patent [19]
Komura et al.

[11] 3,801,737

[45] Apr. 2, 1974

[54] VIDEO SIGNAL COMPRESSION AND EXPANSION SYSTEM AND DEVICES THEREFOR

[75] Inventors: Yasuyuki Komura, Kawasaki; Shinichi Hirata; Takashi Fukushima, both of Yokohama; Mutsuo Ogawa, Tokyo, all of Japan

[73] Assignee: Ricoh Co., Ltd., Tokyo, Japan

[22] Filed: July 10, 1972

[21] Appl. No.: 270,017

[52] U.S. Cl. .............................. 178/6, 178/DIG. 3
[51] Int. Cl. .............................. H04n 7/12
[58] Field of Search .................... 178/6, 6.8, DIG. 3

[56] References Cited

UNITED STATES PATENTS

| | | | |
|---|---|---|---|
| 3,347,981 | 10/1967 | Kagan | 178/DIG. 3 |
| 3,061,672 | 10/1962 | Wyle | 178/DIG. 3 |

*Primary Examiner*—Howard W. Britton
*Attorney, Agent, or Firm*—Cooper, Dunham, Clark, Griffin & Moran

[57] ABSTRACT

A video signal compression and expansion system characterized by comparing, bit by bit, the binary coded video signals of one scanning line derived by the scanning of a pattern with the reference binary coded video signals of the preceding line in such a manner that when the bit patterns coincide with each other, a first signal is generated but when they do not coincide with each other, a second signal is generated, transmitting no signal so long as said first signals follow in succession but transmitting a line address signal representing a scanning line containing said second signal and a bit position signal representing the bit position of said second signal only when said second signal is derived, reproducing the previously prepared binary coded video signals so long as said line address signal is not received, but reversing the bit in polarity at the bit position designated by said bit position signal when said line address signal is received and detected, and using thus obtained video signals as reference video signals for comparison with the video signals in the next scanning line.

17 Claims, 5 Drawing Figures

VIDEO SIGNAL COMPRESSION AND EXPANSION SYSTEM AND DEVICES THEREFOR

BACKGROUND AND SUMMARY OF THE INVENTION:

The present invention relates generally to a system and devices for compressing and expanding video signals and more particularly to a system and devices for compressing the binary coded video signals derived by scanning a pattern and for expanding the compressed signals in order to derive the original binary coded video signals.

In facsimile, the elemental areas of subject copies such as photographs, written messages, maps or drawings are scanned and are converted into binary coded video signals which are transmitted to a reception system. In the reception system, these binary coded video signals are converted into black and white elemental areas, thus reproducing the subject copy. However, when all such binary coded video signals are transmitted, the transmission time is high, and so are transmission charges. Furthermore, it is difficult to interconnect between a facsimile receiver and transmitter through a commercial telephone line with a low transmission rating.

One of the methods for reducing the facimile transmission time which has been developed and demonstrated is the so called delta coding method. In general, when a pattern is scanned along scanning lines spaced apart from each other by a very small distance, the bit patterns contained in adjacent scanning lines are closely co-related with each other. That is, the bit pattern of one scanning line is substantially similar to that of the preceding scanning line and is different only in a few bit positions. The delta coding method is based upon this observed fact, and compresses the binary coded video signals derived by scanning a pattern. In the delta coding method, the binary coded signals contained in one scanning line are compared, bit by bit, with the binary coded video signals of the preceding scanning line. When the binary coded signals or bits in the corresponding bit positions do not coincide with each other, a signal representing "1", which is referred to as "the signal "1"", is generated and when they coincide with each other, a signal representing "0", which is referred to as "signal "0"", is generated. The bit pattern consisting of such signals "1" and "0" is further coded depending upon the run lengths of the signals "1" and "0", that is the number of signals "1" or "0" appearing in succession, and is transmitted to the facimile receiver. As will be readily understood, the number of signals "1" is reduced whereas the number of signals "0" is increased when the pattern is coded in the manner described above as compared with the case in which all of the binary coded video signals are transmitted. Thus, the data or signal compression efficiency may be much improved as compared with the case in which the binary coded video signals are directly coded. In the conventional delta coding method, all of the delta-coded signals for each scanning line are transmitted even when the binary coded video signals of one scanning line are substantially similar to those of the preceding scanning line. Therefore, there arises a problem when a commercial telephone transmission line is used, because sufficient data or signal compression efficiency cannot be attained.

One of the objects of the present invention is therefore to provide an improved video signal compression and expansion system based upon the delta coding method described above.

Another object of the present invention is to provide a data or signal compression and expansion system and devices therefor in which no signal is transmitted from a transmitter or from a signal compression section to a receiver or to a data or signal expansion section as long as the binary coded video signals or bit patterns of adjacent scanning lines coincide with each other, so that the binary coded video signals or bit pattern of the preceding scanning line may be reproduced as they are in the receiver or data expansion section.

The above and other objects, features and advantages of the present invention will become more apparent from the following description of one preferred embodiment thereof taken in conjunction with the accompanying drawing.

BRIEF DESCRIPTION OF THE DRAWING:

FIG. 1-B illustrates the binary coded video signals derived by scanning the patterns shown in FIG. 1-A;

FIG. 1-C illustrates the bit patterns obtained by comparing the bit patterns or binary coded video signals shown in FIG. 1-B;

Figure 1A:
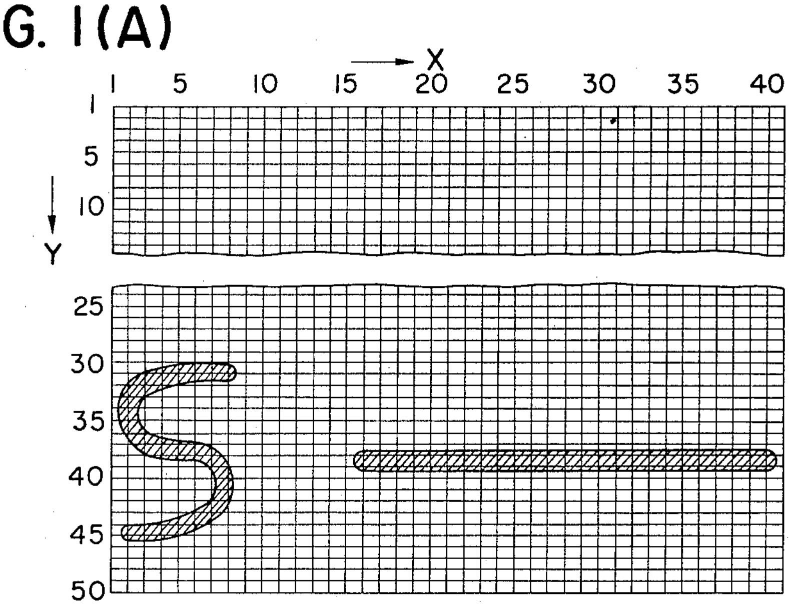
FIG. 1-A illustrates two examples of patterns used to explain the underlying principle of the present invention.
Figure 1B:
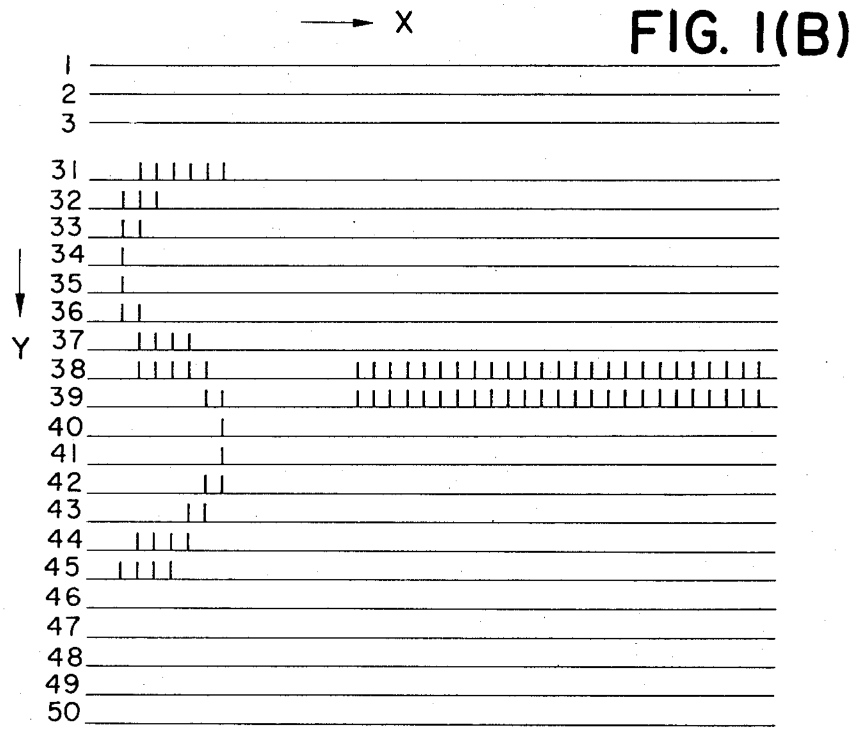
Figure 1C:
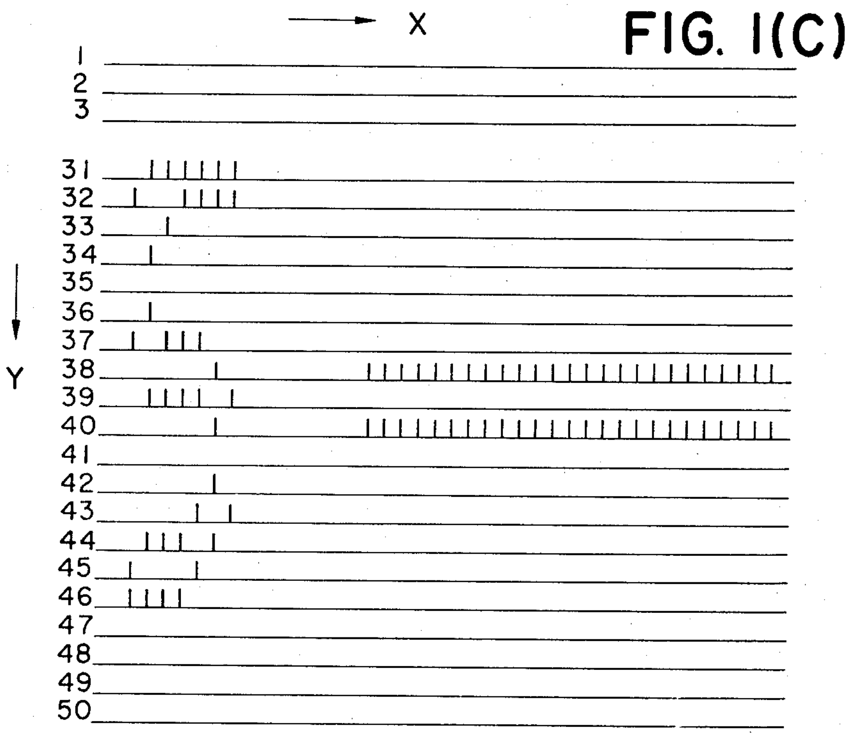

DESCRIPTION OF THE PREFERRED EMBODIMENT:

FIG. 1-A illustrates two examples of patterns "S" and "-" for explanation of the underlying principle of the present invention. When the fifty horizontal lines are scanned (in the X direction), the binary coded video signals shown in FIG. 1-B are derived, the presence of a pulse in FIG. 1-B representing a black dot or elemental area of the patterns and the absence of pulse representing a white dot or elemental picture area. The binary coded video signals obtained in this manner are compared between the adjacent scanning lines at respective bit positions so that when the video signals do not coincide with each other at the corresponding bit positions, a signal representing "1" (a pulse) is generated but when they coincide, a signal representing "0" is generated, as shown in FIG. 1-C. It is seen from FIG. 1-C that the scanning lines from Y-1 to Y-30 and from Y-46 to Y-50 as well as the scanning lines Y-35 and Y-41 contain no signal representing "1". Along the remaining scanning lines, the signals representing "1" or pulses are distributed in defined group patterns. For example, along the scanning line Y-31, the signals representing "1" or pulses appear from X-3 to X-8 bit positions, and along the scanning line Y-38, the signals representing "1" or pulses appear from X-3 to X-7 bit positions and from X-16 to X-40 bit positions.

According to the present invention, the binary coded signals derived as shown in FIG. 1-C by the comparison of the binary coded video signals between the adjacent lines are compressed in accordance with the following rules.

RULE 1:

No signal is transmitted so long as no signal representing "1" or pulse exists in the delta-coded pattern of FIG. 1-C.

RULE 2:

When the signal representing "1" (or pulse) in the delta-coded pattern of FIG. 1-C exists, one of the following two rules is applied depending upon whether the number of bits contained in a bit group of "1" signals is larger than a predetermined number, for example 10, or not.

RULE 2-*a:*

When the number of bits in a bit group of "1" signals is less than a predetermined number, that is when the run length is shorter than a predetermined length, an X bit position address signal representing the X bit position from which the bit group of "1" signals starts, is transmitted and is followed by all of the signals representing "1" in the bit group. This is referred to later as mode 1.

RULE 2-*b:*

When the number of bits in a bit group of "1" signals is greater than a predetermined number, that is when the run length is longer than a predetermined length an address signal representing the X bit position from which the bit group of "1" signals starts as well as an address signal representing the X bit position of the last bit in the bit group are transmitted. This is referred to later as mode Z.

RULE 3:

When the Y scanning line containing the signal or signals representing "1" is followed by Y scanning line containing no signal representing "1", a so called mode A scanning line address signal is transmitted. On the other hand when a Y scanning line containing no signal representing "1" is followed by a Y scanning line containing a signal representing "1", a so called B scanning line address signal is transmitted.

When the above three rules are applied to the binary coded signal patterns shown in FIG. 1-C, a mode A line address signal representing the scanning line Y-1 is transmitted, and no signal is generated at all until the line Y-30 is scanned. The scanning line Y-31 contains one bit group consisting of less than 10 signals "1" so that a mode B line address signal representing the line Y-31 is transmitted, and then the mode 1 address signal representing the first X bit position of the bit group is transmitted and followed by all of the signals "1" in that bit group. Thereafter along the lines from Y-32 to Y-34, the line address signals as well as the signals "1" are transmitted in a manner substantially similar to that described above. The line Y-35 does not contain the signal "1" so that a mode A line address signal representing the line Y-35 is transmitted. The line from Y-36 to Y-40 contain the signals "1" so that the compression of the signals is effected in a manner similar to that described above. The line Y-38 contains two bit groups so that the address signal representing the first bit position of the first bit group is transmitted and followed by all of the signals "1" in the first group. The second bit group contains more than 10 signals "1" so that only the address signals representing the first and last bit positions of the second bit group are transmitted. For the line Y-46 containing no signal "1", a mode A line address signal representing the line Y-46 is transmitted, and thereafter no signal is transmitted until the last line Y-50. At the end of trace along the last line Y-50, a signal representing the end of the vertical scanning may be generated. It should be noted that in case of the lines Y-36 and Y-42 containing only one signal "1", the address signal representing the X bit position of this signal is transmitted.

In order to derive the original binary coded video signals from the compressed signals transmitted in the manner described above, the same signals with those of the preceding scanning line are repeated for each line until a mode B Y-line address signal is received. Upon reception of the mode B Y-line address signal, the binary coded video signals along the preceding line are processed in the following manner. For example, when the address signal representing the first bit position of the bit group as well as the signals "1" in that bit group are received, the signals "1" are reproduced at X bit positions following the X bit position designated by said address signal so long as the signals "1" When the address signals representing the first and last bit positions of the signals "1" of a bit group are received, the binary coded video signals of the preceding line which are between said address signals are reversed in polarity, that is the signals "1" are reproduced in the bit positions designated by said address signals.

Figure 2:
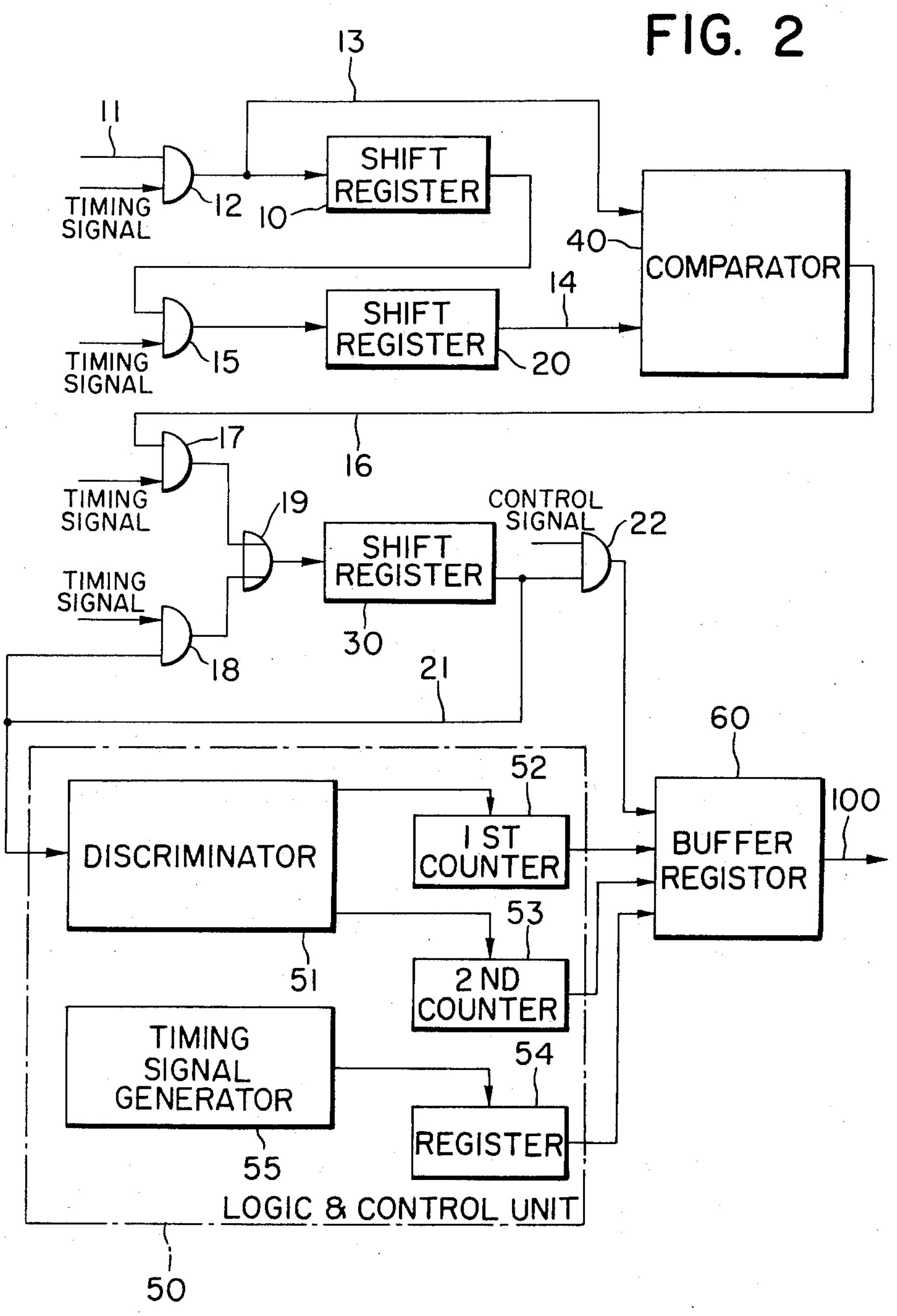
FIG. 2 is a block diagram of a data or signal compression device in accordance with the present invention.

Next, one embodiment of a binary coded video signal compression and expansion system in accordance with the present invention and based upon the above described principle will be described in detail hereinafter with reference to FIG. 2. The binary coded video signals in each line are stored in shift registers 10 and 20. When the timing signal and the binary coded video signals of a new scanning line transmitted through a line 11 are both applied to an AND gate 12, the latter is opened so that the video signals are sequentially stored in the shift register 10. In the second shift register 20, the video signals derived by scanning the preceding scanning line have been already stored. The video signals of the new line are also applied to a comparator 40 through a line 13, and the video signals stored in the second shift register 20 are also applied to the comparator 40 in synchronism with the application of the video signals of the new line to the comparator. The comparator 40 comprises a one-bit exclusive OR circuit so that when the signals on the lines 13 and 14 are simultaneously "1" or are simultaneously " 0", the signal representing "0" to be referred to as "the signal "0"" hereinafter is generated and when one of the signals is "1" or "0" while the other signal is respectively "0" or "1", the signal "1" is derived from the comparator 40. In other words, when the signals at the corresponding bit positions of the new and old lines coincide with each other in polarity, the signal "0" appears on a line 16 whereas when they do not coincide, the signal "1" appears on the line 16. The outputs of the comparator 40 are sequentially stored in a third shift register 30 through an AND gate 17 and an OR gate 19. The third shift register 30 is capable of storing the video signals of one scanning line, as is the case of the first and second shift registers 10 and 20. In the next cycle timing signals are applied to the inputs of the AND gates 15 and 18 so that the binary coded video signals of the new line stored in the first register 10 are transferred into the shift register 20 through the AND gate 15. The video signals stored in the third shift register 30 are circulated through a line 21, the AND gate 18 and an OR gate 19.

The video signals stored in the third shift register 30 are also fed into a logic and control unit 50 comprising a bit pattern discriminator 51, a first counter 52 for counting the scanning line addresses, that is the Y-direction line addresses, a second counter 53 for counting the bit positions in each scanning line, that is the addresses representative of the X bit positions, a register 54 for storing the mode signals to be described in more detail hereinafter, derived from the discriminator 51, and a clock-pulse and timing signal generator 55 for applying clock pulses and timing signals to various components. The contents in the third shift register 30, the counters 52 and 53 and the register 54 are transferred into a buffer register 60 only when so required in a manner to be described in more detail hereinafter.

In operation, the address signal representative of the first scanning line to be referred to as "the Y-1 address" is first stored in the first counter 52, and the mode signal representative of the absence of the signals "1" in the line mode Y-1 to be referred to as "the mode A signal" is stored in the register 54. These Y-1 address signal and the mode A signal are transferred into the buffer register 60. The second counter 53 steps in response to the shift to the right of the third shift register 30. The video signals or bit patterns stored in the third shift register 30 are sequentially fed into the discriminator 51 in the control unit 50 simultaneously when the video signals are re-circulated and are processed in the following manner. When the video signals fed from the third shift register 30 contain no signal "1", the content of the first counter 52 is advanced by one and the video signals of the new line are ready to be received through the line 11. So long as the bit pattern stored in the third shift register 30 contains no signal "1", the above operations are cycled, and no signal is fed into the buffer register 60.

When the bit pattern fed from the third shift register 30 changes from "0" to "1", the mode signal representative of the presence of the signal "1" in the designated scanning line, which will be referred to as "the mode B signal" hereinafter, is stored in the register 54. The discriminator 51 counts the number of bits or signals "1" which follow in succession. When the number of bits is less than 10, the mode signal to be referred to as "mode 1 signal" is stored into a suitable register (not shown) in the discriminator 51. When the number of bits is more than 10, the mode signal to be referred to as "the mode 2 signal" is stored into the register. The above described operations are cycled whenever the bit pattern supplied from the third shift register 30 changes from "0" to "1". When every bit group or group of signals "1" in one scanning line is investigated by the discriminator 51, the mode B signals in the register 54 and the content in the first counter 52, that is the address of the scanning line are transferred into the buffer register 60. Thereafter the content in the third register 30 is recirculated so that whenever the bit pattern changes from "0" to "1", the mode corresponding to each of the groups of signals "1" which have been already investigated, is read out. That is, when the bit pattern changes from "0" to "1", and the mode 1 signal is derived, the code signal representative of the mode 1 signal is fed into the register 54 from the discriminator 51 and then transferred into the buffer register 60. Next the content of the second counter 53, which is counting the address at which the bit pattern changes from "0" to "1", is transferred into the buffer register 60. Simultaneously the control signal is applied to one of the input terminals of an AND gate 22 so that the mode 1 signals are transferred into the buffer register 60 through the AND gate 22, following the content of the second counter 53.

When the bit pattern changes from "0" to "1", and the mode 2 signal is derived, the code representing the mode 2 signal is transferred into the buffer register through the register 54 from the discriminator 51. Next the content of the second counter 53 representing the X position at which the bit pattern changes from "0" to "1" is transferred into the buffer register 60. Thereafter, the counter 53 steps in synchronism with the shift to the right of the third shift register 30, and the X bit position address signal representing the bit position at which the bit pattern changes from "1" to "0" is transferred into the buffer register 60 from the second counter 53. That is, the first content in the second counter 53 transferred into the buffer register 60 represents the bit position address representative of the first bit position of the mode 2 signal. The next content transferred from the second counter 53 to the buffer register 60 represents the last bit position of the mode 2 signal. The above described operations are cycled whenever the bit patterns stored in the third shift register 30 contain the groups of signals "1".

Figure 4:
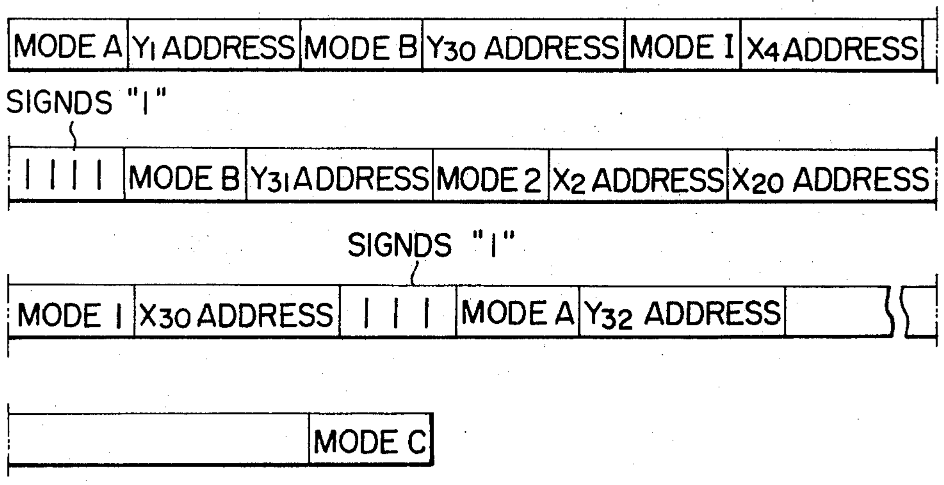
FIG. 4 illustrates one example of the format of the compressed data or signal.

The compressed data stored in the buffer register 60 are transmitted on a line 100 at a predetermined transmission speed under the control of the control unit 50. One example of the type of compressed data which may be transmitted on the line 100 is illustrated in FIG. 4. The example in FIG. 4 is an arbitrary one, and does not represent the patterns of FIGS. 1-A, 1-B or 1-C. It is seen in FIG. 4 that the binary coded video signals of the lines from Y-1 to Y-29 are same. The binary coded video signals of the line Y-30 are different from those of the line Y-29 in that the line Y-30 has four bits or pulses starting from the X-4 bit position. The bit pattern of the line Y-31 is different from that of the line Y-30 in that the line Y-31 has the bits or pulses in the bit positions from X-2 to X-20 and three bits starting from the X-30 bit position. The mode C appearing at the end of the compressed data shown in FIG. 4 represents the end of the scanning.

Figure 3:
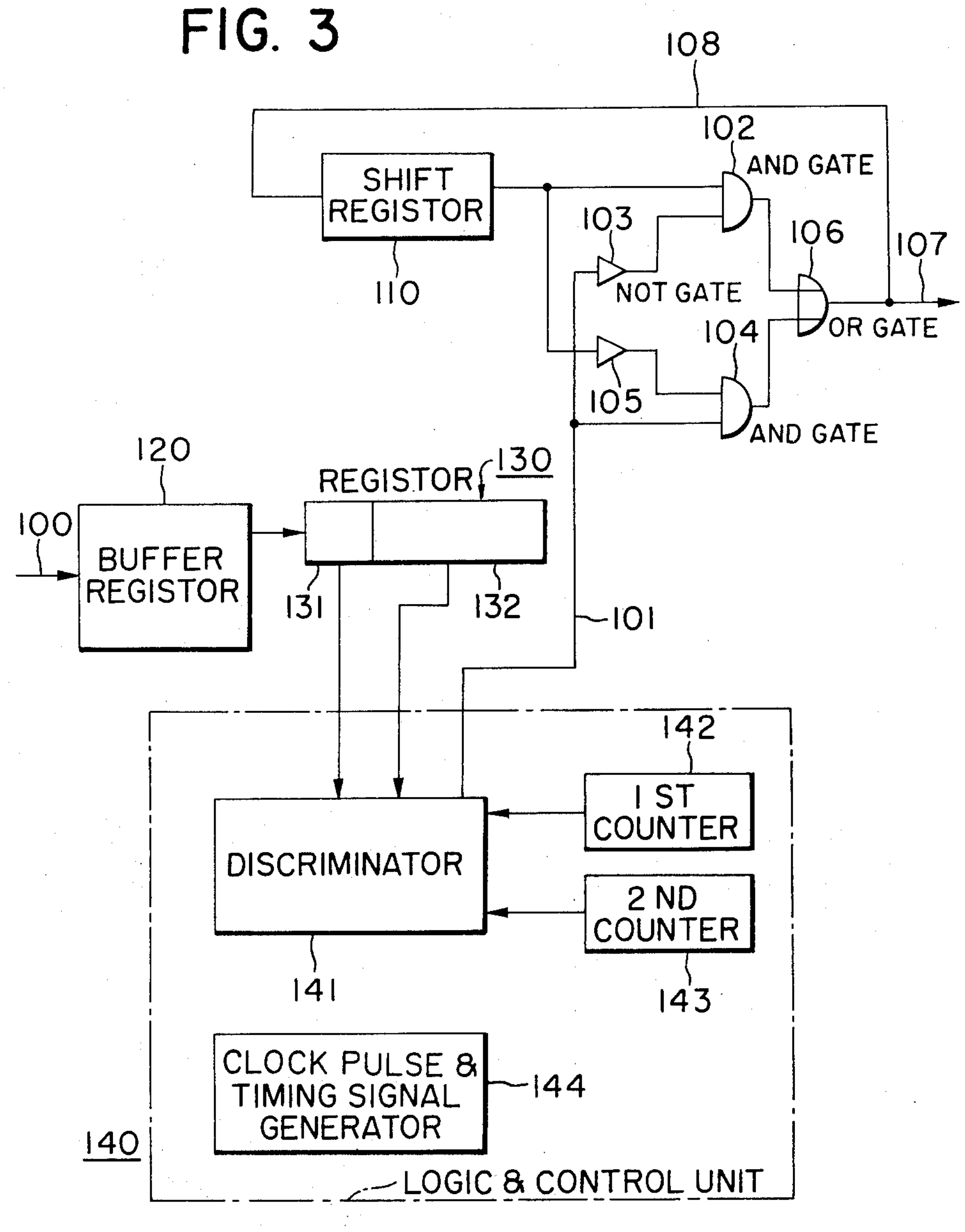
FIG. 3 is a block diagram of a data or signal expansion device in accordance with the present invention.

Next, referring to FIG. 3, a data expansion system is shown which operates in accordance with the present invention for converting or expanding compressed data into the original binary coded video signals. The binary coded video signals of the old line are stored in a shift register 110 which is capable of storing all bits of one scanning line. The compressed data transmitted on the transmission line 100 are fed into a buffer register 120. The content or data stored in the buffer register 120 are sequentially transferred into a register 130 comprising a first section 131 for storing therein the various mode signals such as mode A, mode B, mode 1 and mode 2 signals and a second section 132 for storing the data signals following the mode signals, in response to timing signals. The mode signal and the data signal stored in the first and second register sections 131 and 132, respectively, are transferred into a logic and control unit 140 comprising a discriminator 141, a first counter 142 for counting the scanning line addresses, a second counter 143 for counting the bit positions along each scanning line in synchronism with the shift to the right of the shift register 110, and a clock pulse and timing signal generator 144 for applying clock pulses and timing signals to the various components.

It is assumed that the compressed data as shown in FIG. 4 are transmitted on the transmission line 100 and stored in the buffer register 120. Then, the mode A signal is stored in the first section 131 and the Y-1 address signal is stored in the second section 132. The mode A signal is detected by the discriminator 141, and after the coincidence of the Y-1 address signal stored in the second section 132 with the content in the first counter 142 has been confirmed, the content stored in the shift register 110 is recirculated. In this case, the signal "0" is transmitted on a line 101, and the content in the shift register 110 is shifted to the right in response to the clock pulses supplied from the signal generator 144, and the signal at each bit position is transmitted through an AND gate 102 and an OR gate 106. Simultaneously, the signal is re-entered into the shift register 110 through a circulating line 108. In synchronism with the shift to the right of the shift register 110, the second counter 143 is stepped, and is reset when the shift corresponding to one scanning line is accomplished so that the first counter 142 is advanced by one. Next the mode B signal is stored into the first section 131 and the Y-30 address signal is stored in the second section 132. The discriminator 141 detects that the video signals of the line Y-30 are different from those of the preceding line Y-29. That is, until the content or the Y-30 address signal stored in the second section 132 coincides with the content of the first counter 142, the above described operations are cycled, that is the content of the shift register 110 is re-circulated. When the content in the second section coincides with the content in the first counter 142, the mode 1 signal is stored in the first section 131, and the X-4 address signal and four signals "1" are stored in the second section 132. When the content in the shift register 110 is shifted to the right the discriminator 141 compares with the X-4 address signal in the second section 132 with the content of the second counter 143. Until they coincide with each other, the signal on the control line 101 is zero so that content of the shift register 110 is transmitted through the AND and OR gates 102 and 106 and is re-entered into the shift register 110 through the line 108. When the contents in the second section 132 and in the second counter 143 coincide with each other, the discriminator 141 causes the signal on the control line 101 to change to "1" from "0" so that the AND gate 102 becomes OFF whereas the AND gate 104 becomes ON through NOT circuits 103 and 105, respectively. As a consequence the content in the shift register 110 is reversed by the NOT circuit 105 and is transmitted onto the transmission line 107 through the AND gate 104 and the OR gate 106 and is re-entered into the shift register 110 through the line 108. The operation described above is cycled four times for four bits, and thereafter the signal on the control line 101 is changed again to "0" from "1" so that the content of the shift register 110 is re-circulated through the AND gate 102, OR gate 106 and the line 108 without being reversed in polarity.

In like manner, the data of the line Y-31 are processed. The mode 2 signals are inserted in order to reverse the polarity of the bit signals in the positions from X-2 to X-20 of the content stored in the shift register 110, as shown in FIG. 4. Therefore when the content of the second counter 143 coincides with the X-2 address signal stored in the second register 132, the discriminator 141 causes the signal on the control line 101 to change from "0" to "1", and when the X-20 address signal stored in the second section 132 coincides with the content of the second counter 143, the signal on the control line 101 is again changed from "1" to "0". As a consequence when the content in the shift register 110 is shifted to the right, the bit signals in the bit positions from X-2 to X-20 are reversed in polarity and transmitted onto the output line 107. Thus the compressed data may be sequentially demodulated or converted into the original binary coded video signals.

So far the group of bits or signals "1" has been described as being designated by the mode 1 or 2 signal, but it will be understood that the line containing the bit group or groups may be designated by the mode 1 or 2 signal. The compressed data designated by the mode 1 signal is co-related with the total number of signals "1" stored in the register 30 in FIG. 1, whereas the compressed data designated by the mode 2 signal is co-related with the number of reversals in polarity of the signals stored in the register 30. Therefore, these co-relations may be computed by the logic and control unit 50 in order to find out which data compression by the mode 1 or 2 is more effective. Thus the data compression mode in each line may be designated by the mode 1 or 2 signal.

What is claimed is:

1. A signal compression device comprising a. a first shift register for storing therein the binary coded video signals of a pattern along a line being scanned, a second shift register for storing therein the binary coded video signals derived by the scanning of the preceding line, b. a comparator for comparing, bit by bit, said two video signals in such a manner that when the video signals in the corresponding bit positions coincide with each other, a signal representing "0" may be generated but when they do not coincide with each other, a signal representing "1" may be generated, and c. a logic and control circuit for generating a group of signals consisting of a line address signal representing a scanning line containing said signals representing "1" and an address signal representing the bit position from which a group of said signals representing "1" appear in succession or said address signal representing the bit position from which a group of said signals representing "1" appear in succession and an address signal representing the bit position at which the last of said signals representing "1" in said group appears, depending upon the number of said signals representing "1" contained in said group.

2. A signal expansion device comprising a. a shift register for storing therein the binary coded video signals contained in the preceding scanning line, b. a register for storing therein a signal group consisting of an address signal representing the bit position from which a group of signals representing "1"

appear in succession with or without an address signal representing the bit position at which the last of said signals representing "1" appears, and c. means for circulating the content in said shift register while transmitting on an output line said content as long as said signal group is not received in said register, and for reversing the bit pattern in polarity of said content in said shift register designated by said signal group when said signal group is received in said register and transmitting said content whose bit pattern has been reversed in polarity onto said output line while circulating the same.

3. Apparatus for compressing video signals representing successive binary coded video scan lines each identified by a Y-address, comprising:

means for comparing each current scan line with the preceding scan line by comparing each pair of correspondingly positioned elemental areas of the two scan lines and for generating a first signal when a pair of compared elemental areas coincide and a second signal when a pair of compared elemental areas do not coincide to thereby generate a current delta signal line comprising the first and second signal resulting from the comparison of the current and the preceding scan lines by the comparing means;

means for comparing the current and the preceding delta signal lines and for inhibiting the generation of output signals when the current delta signal line contains only first signals and the preceding delta signal line also contains only first signals, for generating as output signals a Mode A signal and the Y-address of the current scan line when the current delta signal line contains only first signals but the preceding delta signal line contains at least one second signal, and for generating as output signals a Mode B signal followed by the Y-address of the current scan line when the current delta signal line contains at least one second signal;

means for generating as output signals following each Mode B signal an X-address representing the position of the first of each set of one or more immediately adjacent second signals in the current delta signal line followed by each of the second signals of the set if the number of second signals in the set is less than a predetermined number; and means for generating as output signals a first X-address representing the start of a set of immediately adjacent second signals whose number is greater than said predetermined number and a second X-address representing the end of the last recited set.

4. Apparatus as in claim 3 wherein each of the scan lines is represented as a succession of binary bits, and wherein said first signals are binary zeros and said second signals are binary ones.

5. Apparatus as in claim 3 wherein the elemental areas compared by the scan line comparing means are correspondingly positioned binary bits of the two video scan lines which are compared.

6. Apparatus as in claim 3 including means for supplying to the scan line comparing means defined binary coded signals representing the nonexistent preceding scan line when the current scan line is the first of a succession of scan lines and for supplying to the delta signal line comparing means defined binary signals representing the nonexistent corresponding previous delta signal line.

7. Apparatus as in claim 6 wherein each of the video scan lines is represented by a succession of binary signals, and wherein said first signals are binary zeros and said second signals are binary ones.

8. Apparatus as in claim 7 wherein said elemental areas which are compared by the scan line comparing means are correspondingly positioned binary bits of the two scan lines which are compared.

9. Apparatus as in claim 3 wherein the scan line comparing means comprise a first shift register for storing the binary coded signals representing the current scan line, a second shift register receiving the output of the first register to store thereby the preceding scan line, and a comparator receiving the outputs of the first and the second shift registers to compare thereby the current and the preceding scan line and to generate a succession of delta signals.

10. Apparatus as in claim 9 wherein the delta signal line comparing means comprise a shift register for storing the delta signals output from the comparator, a first counter for storing the Y-address of the current scan line, a second counter for storing the X-address of the bit position currently compared by the comparator, a Mode A and B register storing a Mode A signal if the current delta signal line contains only first signals but the preceding delta signal line contained at least one second signal and storing a Mode B signal if the current line has at least one second signal, a buffer register, and a discriminator for inhibiting loading of the buffer register when both the preceding and the current delta signal lines contain only first signals, for loading into the buffer register the contents of the first counter and of the Mode A and B register when the preceding delta signal line contained at least one second signal but the current delta signal line contains only first signals, and for loading into the buffer register the contents of the first counter and of the Mode A and B register when the current delta signal line contains at least one second signal.

11. Apparatus as in claim 10 wherein the discriminator includes means for detecting the number of successive second signals in the current delta signal line and for loading into the buffer register the contents of the second counter and the successive second signals of a set of second signals which is shorter than a predetermined length and for loading into the buffer register the contents of the second counter at the start of a set of second signals which is longer than said predetermined length and the contents of the second counter at the end of the last recited set of second signals.

12. Method of compressing video signals representing successive binary coded video scan lines each identified by a Y-address, comprising:

comparing each current scan line with the preceding scan line by comparing each pair of correspondingly positioned elemental areas of the two scan lines and generating a first signal when a pair of compared elemental areas coincide and a second signal when a pair of compared elemental areas do not coincide to thereby generate a current delta signal line comprising the first and second signals resulting from the comparison of the current and the preceding scan lines;

comparing the current and the preceding delta signal lines and inhibiting the generation of output signals when the current delta signal line contains only first signals and the preceding delta signal line also contains only first signals, generating as output signals a Mode A signal and the Y-address of the current scan line when the current delta signal line contains only first signals but the preceding delta signal line contains at least one second signal, and generating as output signals a Mode B signal followed by the Y-address of the current scan line when the current delta signal line contains at least one second signal;

generating as output signals following each Mode B signal an X-address representing the positions of the first of each set of one or more immediately adjacent second signals in the current delta signal line followed by each of the second signals of the set if the number of second signals in the set is less than a predetermined number; and generating as output signals a first X-address representing the start of a set of immediately adjacent second signals whose number is greater than said predetermined number and a second X-address representing the end of the last recited set.

13. Method as in claim 12 wherein each of the scan lines is represented as a succession of binary bits, and wherein said first signals are binary zeros and said second signals are binary ones.

14. Method as in claim 12 wherein the scan line elemental areas which are compared are correspondingly positioned binary bits of the two video scan lines which are compared.

15. Method as in claim 12 including supplying defined binary coded signals representing the nonexistent preceding scan line when the current scan line is the first of a succession of scan lines and comparing the supplied signals with the first scan line, and supplying defined binary signals representing the nonexistent corresponding previous delta signal line and comparing the last recited supplied signals with the current delta line.

16. Method as in claim 15 wherein each of the video scan lines is represented by a succession of binary signals, and wherein said first signals are binary zeros and said second signals are binary ones.

17. Method as in claim 16 wherein said scan line element areas which are compared are correspondingly positioned binary bits of the two scan lines which are compared.

* * * * *